Oct. 5, 1965  W. L. SAUNDERS  3,209,856
EXHAUST SYSTEM
Filed June 25, 1963
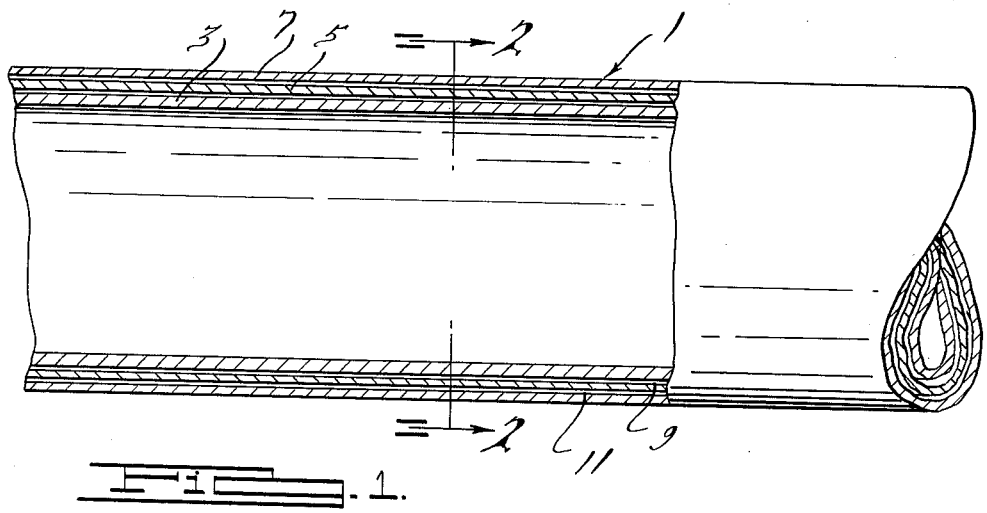
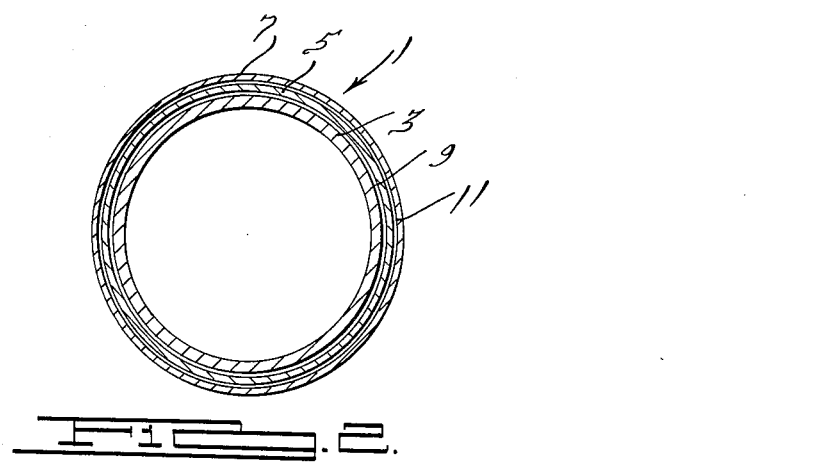
INVENTOR.
William L. Saunders.
BY
Harness, Dickey & Pierce.
ATTORNEYS.

3,209,856
EXHAUST SYSTEM
William L. Saunders, Jackson, Mich., assignor to Walker Manufacturing Company, a corporation of Delaware
Filed June 25, 1963, Ser. No. 290,402
1 Claim. (Cl. 181—41)

This invention relates to conduits used in automotive exhaust systems. Such conduits are referred to in the field as "exhaust pipes" or "tailpipes" depending whether they come before or after the muffler. The invention is applicable to both and, accordingly, both are included in the term "exhaust conduit" as used hereinafter.

It is an object of the invention to provide an exhaust conduit that has maximum sound deadening characteristics and good bendability.

The invention comprises an exhaust conduit composed of three telescoped pipes that fit loosely together to provide a loose three layer laminated conduit wall structure. The innermost pipe is the thickest and the outer two are preferably of the same thickness.

The exhaust conduit is illustrated in the accompanying drawings in which:

FIGURE 1 is a side elevation of a portion of an automotive exhaust gas conduit embodying the invention, a part thereof being shown in longitudinal cross section; and FIG. 2 is a transverse cross section taken along the line 2—2 of FIG. 1.

The automotive exhaust gas conduit 1 consists of three telescoped pipes 3, 5, and 7. It is the essence of this invention that the innermost pipe 3 have a substantially thicker wall than the intermediate and outer pipes 5 and 7. Pipes 5 and 7 preferably have the same wall thickness. The inner pipe should be at least 25% thicker and preferably about 50% thicker than the next thickest of the three layers. The clearance between the layers of pipe should be such that the pipes can easily move relative to each, being what mechanics call a "loose fit."

A specific example of an embodiment of the invention giving excellent results is as follows:

Pipe 3—1¾ inch O.D., wall thickness 0.060″
Pipe 5—1⅞ inch O.D., wall thickness 0.042″
Pipe 7—2 inch O.D., wall thickness 0.042″

These are commercial steel tubing sizes and the pipes are readily available on the open market. These sizes produce nominal clearances 9 and 11 of 0.41″ between the layers (such clearances being shown exaggerated and the pipes concentric for simplicity of illustration).

Exhaust gas conduits according to the invention are remarkably "dead" and have no pipe ring and attenuate exhaust gas "ping." Additionally, they can be bent to the various irregular shapes required in modern automotive exhaust systems without substantial "wash out" or "wrinkling" at the bends during press bending. In bending, the thick inner pipe 3 serves as a mandrel to facilitate bending of the outer two layers.

Conduits according to the invention are particularly well suited for expensive, luxury automobiles where quality and performance are prime requisites but minimum cost is also important.

What is claimed is:

An automotive exhaust gas conduit consisting of three pipes formed of commercial tubing telescoped together in a loose fit, the outermost of the pipes being 2 inches in outer diameter and having a wall thickness of 0.042 inch, the intermediate of said pipes having an outer diameter of 1⅞ inches and a wall thickness of 0.042 inch. and the innermost of said pipes having an outer diameter of 1¾ inches and a wall thickness of 0.060 inch, the innermost of said pipes serving as a mandrel during press bending of the conduit.

References Cited by the Examiner
UNITED STATES PATENTS

| | | | |
|---|---|---|---|
| 1,800,538 | 4/31 | Johnson | 181—36 |
| 2,774,384 | 12/56 | Wallace | 138—69 |
| 3,009,484 | 11/61 | Dollens | 181—36 |
| 3,061,039 | 10/62 | Peters | 181—62 |
| 3,133,612 | 5/64 | Sailler | 181—36 |

FOREIGN PATENTS 1,719,175 12/58 France.
562,192 6/44 Great Britain.

LEO SMILOW, Primary Examiner.

UNITED STATES PATENT OFFICE
CERTIFICATE OF CORRECTION

Patent No. 3,209,856

October 5, 1965

William L. Saunders

It is hereby certified that error appears in the above numbered patent requiring correction and that the said Letters Patent should read as corrected below.

Column 2, line 41, for "1,719,175" read -- 1,179,175 --.

Signed and sealed this 26th day of April 1966.

(SEAL)
Attest:

ERNEST W. SWIDER
Attesting Officer

EDWARD J. BRENNER
Commissioner of Patents